UNITED STATES PATENT OFFICE.

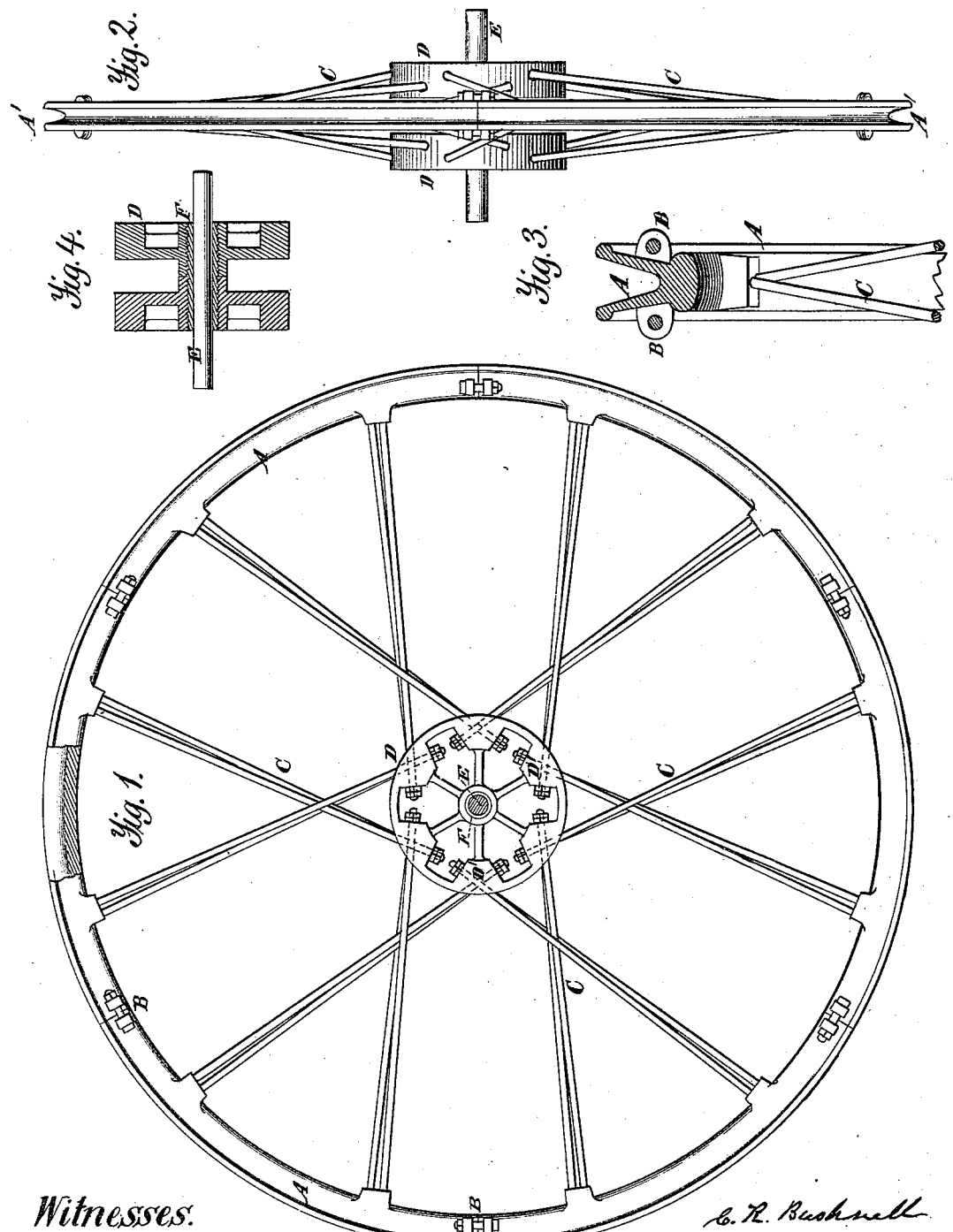

CHARLES R. BUSHNELL, OF MINNEAPOLIS, MINNESOTA.

IMPROVEMENT IN BAND-PULLEYS.

Specification forming part of Letters Patent No. 192,562, dated July 3, 1877; application filed May 2, 1877.

*To all whom it may concern:*

Be it known that I, CHARLES ROGERS BUSHNELL, of Minneapolis, in the county of Hennepin and State of Minnesota, have invented a new and useful Improvement in Pulleys for Wire-Rope Driving-Bands, of which the following is a specification:

The object of this invention is to make a pulley for driving machinery by wire-rope; and it consists in using sectional segments of cast-iron connected to a central hub by wrought-iron rods, which at the same time form braces for the wheel, and make it strong as well as light.

In the annexed drawings, making part of this specification, Figure 1 is a side elevation. Fig. 2 is an elevation showing the edge of the wheel. Fig. 3 is a section through the rim at the junction of two sections. Fig. 4 is a section through the hub.

The same letters are employed in all the figures in the indication of identical parts.

The rim is cast in several segments, say six, connected at the ends by lugs and bolts B. C C are wrought rods, which form the spokes or arms of the wheel, and are set by screws, or other convenient manner, into holes formed in the inner face of the rim. D is the hub, made in two parts, and connected with the shaft E by a sleeve, F, which is keyed to the shaft, and onto which the hubs are screwed or otherwise secured.

The hubs have annular recesses in their outer faces, and solid parts D', the faces of which are formed on planes at right angles to the line of the spoke, which passes through their centers. The spokes are inclined outwardly, and also crossed, as shown, and in this position held by nuts on their inner ends, drawn down against the faces of the solid projections D'.

This arrangement of the spokes is such as to brace and greatly strengthen the wheel, so that when put together it may be placed on a lathe, and turned down to proper form on the periphery.

The invention is illustrated as applied to a V-pulley; but it is evident that flat-faced band-pulleys and fly-wheels may be made in the same manner, the invention relating to the mode of connecting and bracing the segments of the rim, and not to the particular use suggested.

The bracing is effected by making the hub in two parts, each receiving a set of spokes. The thickness of the hub is greater than that of the rim; or, the spokes being brought out in twos from the same part of the rim, they will have an inclination outward at the hub, thus forming a strong lateral bracing for the wheel. The wheel is further braced by the spokes, which are not radially placed, but inclined to the right or left of the central shaft, alternately, the spokes crossing one another both in the solid part D' of the hub and outside the hub, so that each spoke crosses both the adjoining ones in the series.

What I claim as my invention, and desire to secure by Letters Patent, is—

1. The combination of the segments A, tie-bolts B, hub D, and crossed and inclined rods C, forming the spokes, which are drawn down to brace the wheel by nuts on their inner ends bearing against the faces D', substantially as set forth.

2. A pulley formed in segments, connected with the hub by adjustable wrought-iron spokes, inclined and crossing one another, to brace the wheel, substantially as set forth.

3. In combination with the sectional and segmental rim and spokes, the hub formed in two parts, to receive counterbracing-spokes, extending from the same part of the rim, the alternate spokes on each side crossing one another, substantially as set forth.

In testimony whereof I have signed my name to this specification in the presence of two subscribing witnesses.

C. R. BUSHNELL.

Witnesses:
P. D. McMILLAN,
C. D. HAREN.